United States Patent
Taratorin

(10) Patent No.: US 7,126,773 B1
(45) Date of Patent: Oct. 24, 2006

(54) WRITE PRECOMPENSATION METHOD FOR PERPENDICULAR MAGNETIC RECORDING

(75) Inventor: Alexander Taratorin, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 31 days.

(21) Appl. No.: 11/093,929

(22) Filed: Mar. 30, 2005

(51) Int. Cl.
*G11B 5/09* (2006.01)
*G11B 5/02* (2006.01)

(52) U.S. Cl. .......................................... 360/46; 360/68
(58) Field of Classification Search ..................... None
See application file for complete search history.

(56) References Cited

U.S. PATENT DOCUMENTS

| | | | |
|---|---|---|---|
| 4,891,718 A | 1/1990 | White | |
| 6,728,057 B1 | 4/2004 | Putnam | |
| 2002/0135920 A1 | 9/2002 | Aoyagi et al. | |
| 2003/0103290 A1 | 6/2003 | Atsumi | |
| 2005/0200996 A1* | 9/2005 | Musungu et al. | 360/51 |

FOREIGN PATENT DOCUMENTS

JP  2000-207704  7/2000

* cited by examiner

*Primary Examiner*—Hoa T. Nguyen
*Assistant Examiner*—Mitchell Slavitt
(74) *Attorney, Agent, or Firm*—Larry B. Guernsey; Intellectual Property Law Offices

(57) ABSTRACT

A method is presented for precompensation of Non-Linear Transition Shift (NLTS) in magnetic recording media using a perpendicular recording write head. The method includes maintaining a count of non-transition data bits ("zeroes") preceding a data transition ("one") to be written. A precompensation value is assigned which correlates to the count of non-transition data bits preceding the data transition to be written. The assigned precompensation value is then applied to delay timing of a write signal sent to the perpendicular recording write head so that the location of the actual written data transition more closely aligns with an ideal location of the data transition to be written.

13 Claims, 8 Drawing Sheets

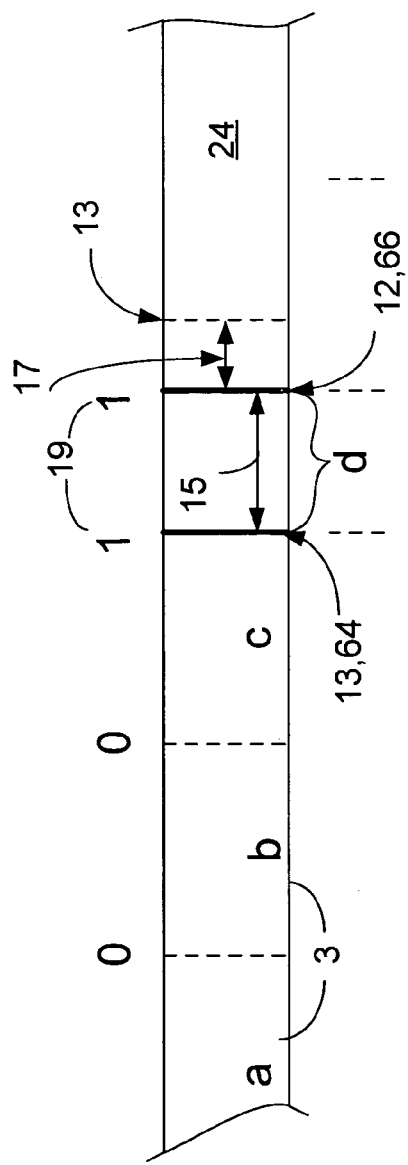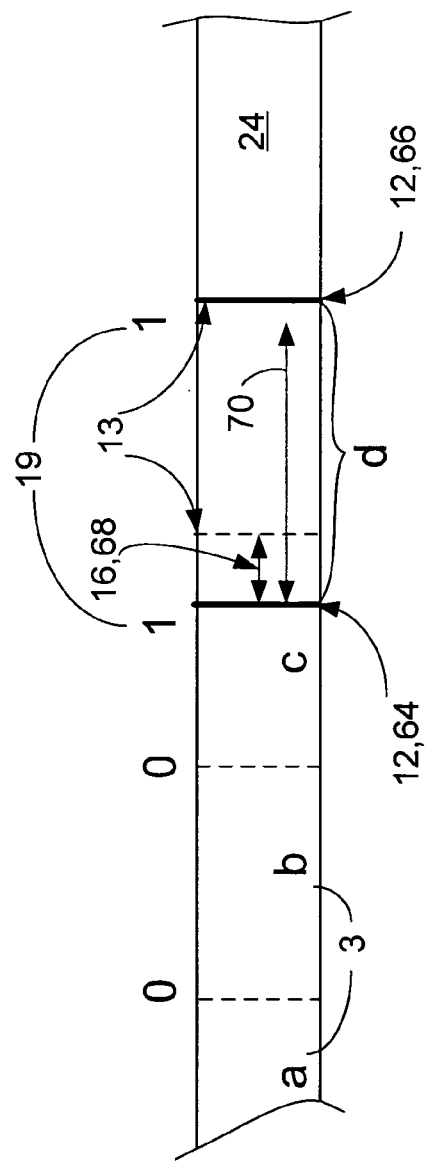

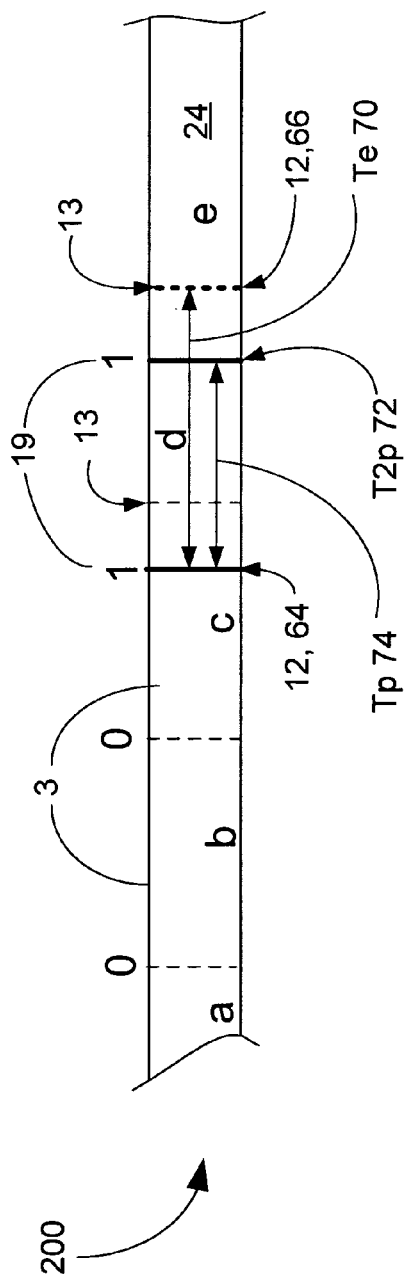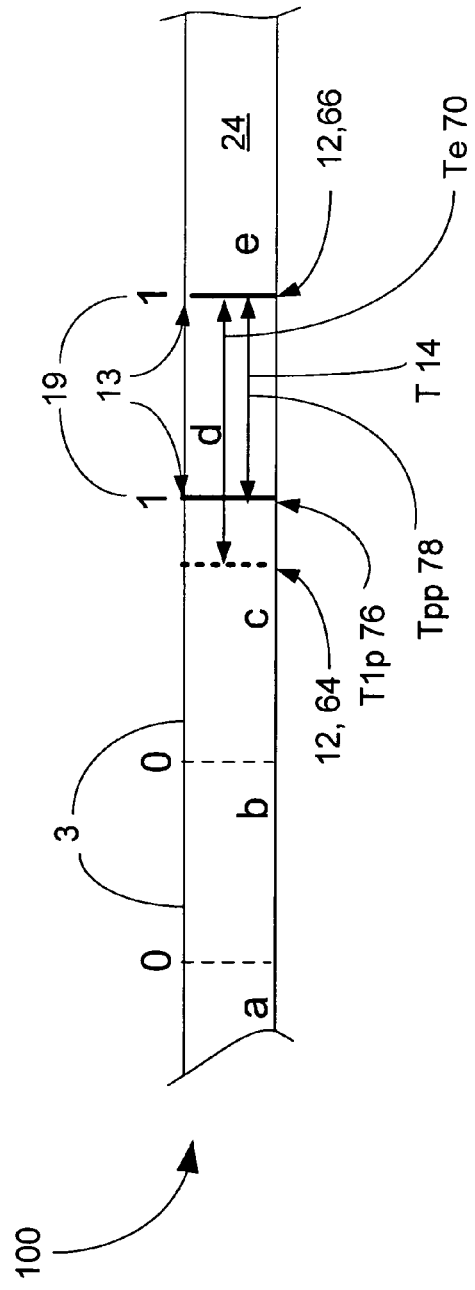

WRITE PRECOMPENSATION METHOD FOR PERPENDICULAR MAGNETIC RECORDING

BACKGROUND OF THE INVENTION

1. Field of the Invention

The present invention relates to disk drive heads for high track density perpendicular magnetic recording, and more particularly relates to a method of precompensating for non-linear transition shifts in data writing.

2. Description of the Prior Art

Present magnetic data recording systems such as disk drives record data on a magnetic recording medium such as a magnetic hard disk, as a series of magnetic field transitions, or changes in direction of magnetic polarity. Typically, the lack of a magnetic transition represents a binary "0", while a magnetic transition represents a binary "1". The magnetic write field is typically created by passing a current through a write head adjacent to the medium, creating a "write bubble" which defines a region where the magnetic field is sufficiently strong to be magnetically recorded on the medium. Magnetic transitions are created by reversing the direction of current flowing through the write head.

Until recently, data has been conventionally stored in a thin media layer adjacent to the surface of a hard drive disk in a longitudinal mode, i.e., with the magnetic field of bits of stored information oriented generally along the direction of a circular data track, either in the same or opposite direction as that with which the disk moves relative to the transducer.

More recently, perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the write pole. In this type of disk drive, the magnetic field of bits of stored information are oriented normally to the plane of the thin film of media, and thus perpendicular to the direction of a circular data track, hence the name.

Media used for perpendicular recording typically include a hard magnetic recording layer and a soft magnetic underlayer which provide a flux path from the trailing write pole to the leading opposing pole of the writer. Current is passed through the coil to create magnetic flux within the write pole. The magnetic flux passes from the write pole tip, through the hard magnetic recording track, into the soft underlayer, and across to the opposing pole, completing a loop of flux.

Perpendicular recording designs have the potential to support much higher linear densities than conventional longitudinal designs. Magnetization transitions on the bilayer recording disk are recorded by a trailing edge of the trailing pole and reproduce the shape of the trailing pole projection on the media plane, thus the size and shape of the pole tip is of crucial importance in determining the density of data that can be stored.

In both longitudinal and perpendicular write heads, there is a common problem concerning the standardized lengths of the regions in which the data bits are written. This problem is illustrated for the case where longitudinal recording is used in FIG. 2, and in the case where perpendicular recording is used in FIG. 3.

FIG. 2 shows the poles of a write head 6 over the surface of a magnetic recording medium, assumed to be a hard disk 24, as the disk moves in the direction of the arrow 7. The magnetic data bits on the left side are shown to have been established earlier as the write head 6 has written to them. For ease of reference, the data bits 3 have been labeled alphabetically as "a", "b", etc. The primary direction of the magnetic orientation of the data bits 3 is shown by the larger upper data bit direction arrows 4. It can be seen that when two consecutive data bit arrows point in the same direction (to the right in the figure) as do the first two arrows 4 in bit areas a and b, the data bit is a "0". However when the consecutive arrows point in opposite directions, as they do in data bits b and c, where the second arrow points right and the third arrow points left, a transition has occurred, thus signifying a "1" data bit. Underneath the data bit direction arrows 4, are smaller D arrows 5 which show the presence and relative strength of a demagnetization field, to be called "D" for purposes of this specification. The D arrow 5 always is opposite in direction from the data bit direction arrow 4, and varies in strength, as indicated by the length of the D arrows. It will be noted that the length of the D arrow 5 in data bit a is larger than the D arrow 5 that in data bit b, although they have the same direction, since there is no transition present. It is commonly observed in longitudinal recording that the D field strength is greatest right after a transition (signifying a "1") and decreases with subsequent non-transition data bits, i.e. subsequent zeroes, eventually reaching a steady state minimum value when a long string of zeroes is written.

A difficulty can result when the write head 6 writes a transition, signifying a "1". In this case, the direction of applied magnetic field 8 will be opposite to that of the previous data bit arrow 4, but will be aligned with the previous D arrow 5 component. This additional D component thus adds to the field strength produced by the write head, and increases the size of the write bubble, making it expand from its normal extent to an increased extent. This is shown when the next data bit d is being written in FIG. 2. The data bit direction arrow 4 of data bit c points left, and the D arrow 5 points right. The applied magnetic field direction arrow 8 points to the right, so a transition is being written. The normal extent of the write bubble 9 is shown in the inner dashed line. However, due to the addition of the D field arrow 5, in the same direction as the applied magnetic field arrow 8, the write bubble is extended to make an expanded write field bubble 10. The extent of the expanded write field bubble 10 will determine where the transition boundary 12 will be positioned.

In this case, the transition boundary 12 thus is written farther to the left in the figure than that ideally transition boundary 13 positioned by the normal extent write field bubble 9. The actual transition boundary 12 is thus displaced from the ideal transition boundary 13 by some non-linear amount. This phenomenon is known as a "non-linear transition shift" (NLTS) in the magnetic transition pattern. These transition shifts can potentially cause errors in reading data from the disk, and can effectively limit the data recording rate of the disk drive to a level where the occurrence of transition shifts are sufficiently low to ensure accurate data recovery from the disk. The amount of the NLTS 16 is shown as the difference between the ideal transition boundary 13 and the actual transition boundary 12. As the actual transition boundary 12 is moved forward in time (left in the figure) compared to the ideal transition boundary 13, this type of NLTS is referred to as "positive NLTS" 17.

As a standard way of measuring the effect of NLTS, it has become common to look at a pair of transitions, where a "1" is followed by another "1", with or without intervening zeroes. This transition pair is commonly referred to as a "dibit" 18. The period of the dibit 18, which in this case corresponds to data bit c, is thus decreased, as shown by the decreased period Td 15 of the dibit 18, compared in the figure with the normal period T 14.

As discussed above, in longitudinal recording, the magnitude of the D field decreases with distance from the last recorded transition. Thus the amount of NLTS is variable, with the largest effect being seen in successive transitions, and the effect lessening with each successive non-transition. Thus a pattern reading "1 1" would have a large NTLS, a pattern reading "1 0 1" would have less NTLS, a pattern reading "1 0 0 1" even less, and so on.

This pattern is reversed in perpendicular recording, shown in FIGS. 3–6. FIG. 3 shows the P3 pole tip 52 over the surface of the hard disk 24, as the disk moves in the direction of the arrow 7. The magnetic data bits on the left side are shown to have been established earlier as the write head has written to them. For ease of reference, the data bits 3 have again been labeled alphabetically as "a", "b", etc.

In perpendicular recording, as its name suggests, the direction of the magnetic bits is perpendicular to the disk surface, i.e. "up" and "down" in the figure. The primary direction of the magnetic orientation of the data bits 3 is shown by the larger data bit direction arrows 4 and to the right of the direction arrows 4, the demagnetization (D) field arrows 5 are shown in shorter dashed lines. Once again the magnetic data bits 3 on the left side are shown to have been established earlier as the P3 pole 52 has passed over them. Again it can be seen that when two consecutive data bit arrows point in the same direction (up in the figure) as do the first three arrows in a, b and c, the data bit is a "0". However when consecutive arrows point in the opposite direction, as in c and d, a transition has occurred, thus signifying a "1" data bit, the same pattern as in the longitudinal recording.

As before, the D arrow 5 always is opposite in direction from the data bit direction arrow 4, and varies in strength, as indicated by the length of the D arrows 5. However, the difference with perpendicular recording is that the D field strength is smallest right after a transition, and grows larger with successive non-transitions, eventually reaching a steady state value when a long string of zeroes is written. Thus, it will be noted that the length of the D arrow in data bit a is smaller than that in data bit b, which is smaller than in data bit c, although they have the same direction, since there is no transition present.

Once again, when the P3 pole 52 writes a transition, signifying a "1", the direction of applied magnetic field 8 will be opposite to that of the previous data bit arrow 4, but will be aligned with the D arrow 5 component of data bit e. This additional D component thus adds to the field strength produced by the P3 pole 52, and increases the size of the write bubble, making it expand from its normal extent 9 to an increased extent 10. The transition thus is written farther to the left in the figure than that ideally positioned by the normal extent field 9.

As discussed above, a dibit 18 includes a pair of transitions, where a "1" is followed by another "1", with or without intervening zeroes. The period of the dibit 18, which in this case corresponds to data bits d and e, is thus decreased, as shown by the decreased period Td 15 of the dibit 18, compared in the figure with the normal period T 14.

As referred to before, the D field component increases with successive non-transitions, and thus the amount of NLTS is variable, however with the smallest effect being seen in successive transitions, and the effect increasing with each successive non-transition. Thus a pattern reading "1 1" would have almost no NTLS, a pattern reading "1 0 1" would have a small NTLS 16, as shown in FIG. 4, a pattern reading "1 0 0 1" having more NTLS 16, as shown in FIG. 5, and a pattern reading "1 0 0 0 1" having even more NTLS 16, as shown in FIG. 6.

The NLTS phenomenon has been observed and accounted for in prior art magnetic recording systems by a process known as precompensation. Precompensation attempts to adjust the timing of the current transition bit to ensure that the transition is located properly on the medium, compensating for the effect of the demagnification field of the previous transition bits on the write bubble field used to record the current transition bit. Write precompensation is commonly used in longitudinal magnetic recording systems. The demagnetization field in longitudinal recording is maximum in the vicinity of magnetic transition. This field causes non-linear transition shift for transitions, recorded at high linear density, so as the recorded closely spaced transitions are shifted "early". The standard write precompensation method is utilized in longitudinal magnetic recording channels, applying "late" delays of magnetic transitions, preceeded by another transition.

This precompensation strategy can not be applied to perpendicular recording. As discussed above, the demagnetization field in perpendicular media is small at the transition vicinity and increases with distance. This is opposite to the longitudinal media and causes maximum transition shifts for relatively isolated transitions. High density transitions (successive "1"s) are not distorted by NLTS (K. Senanan, R. Victora "Theoretical Study of Non-Linear Transition Shift in Double Layer Perpendicular Media"—IEEE Trans. Magnetics, vol. 38, 42002 pp., 1 Combination of these effects causes "negative" NLTS, which was experimentally measured in perpendicular recording media. Therefore, the precompensation method for perpendicular recording is to be modified, compared with longitudinal recording case.

The straightforward solution for precompensation of perpendicular recording channels is to use "negative" precompensation, i.e. shift all high density transitions "early" in time. However, it is believed that this method has not been implemented in practical systems. Negative precompensation of high density transitions may present technical difficulties at high data rates, requiring effective increase of channel frequency. Also, the negative precompensation does not allow more complicated precompensation schemes, having more than one level of timing shifts and providing better control of total non-linear distortion Thus there is a need for a precompensation system for perpendicular write heads that can compensate for the NLTS effect without the disadvantages of negative precompensation, and which can allow multiple levels of delay to account for variable NLTS.

SUMMARY OF THE INVENTION

A preferred embodiment of the present invention is a method of precompensation for Non-Linear Transition Shift (NLTS) in magnetic recording media using a perpendicular recording write head. The method includes maintaining a count of non-transition data bits ("zeroes") preceding a data transition ("one") to be written. A precompensation value is assigned which correlates to the count of non-transition data bits preceding the data transition to be written. The assigned precompensation value is then applied to delay timing of a write signal sent to the perpendicular recording write head so that the location of the actual written data transition more closely aligns with an ideal location of the data transition to be written. In other words, the transition is written "late" to overcome the NLTS effect which would tend to write it "early".

It is an advantage of the present invention that "late" precompensation delays of isolated transitions have less problems of implementation than "early" (or negative) precompensation of high density transitions.

It is a further advantage of the precompensation method of the present invention that higher data rates can be achieved.

It is a yet further advantage of the precompensation method of the present invention that it can use standard circuitry of current magnetic recording channels.

It is another advantage of the precompensation method of the present invention that it allows multi-level precompensation for precise position control.

It is still another advantage of the precompensation method of the present invention that it can compensate for variations in NTLS by multi-level precompensation.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

The following drawings are not made to scale as an actual device, and are provided for illustration of the invention described herein.

FIG. 9 (prior art) is a detail view of data bits exhibiting NTLS in longitudinal recording of the prior art;

FIG. 10 (prior art) is a detail view of data bits exhibiting NTLS in perpendicular recording;

FIG. 11 (prior art) is a detail view of data bits where a prior art precompensation method is used to counter NTLS in perpendicular recording; and FIG. 12 is a detail view of data bits where the method of the present invention is used to counter NTLS in perpendicular recording.

DETAILED DESCRIPTION OF THE PREFERRED EMBODIMENTS

Figure 1:
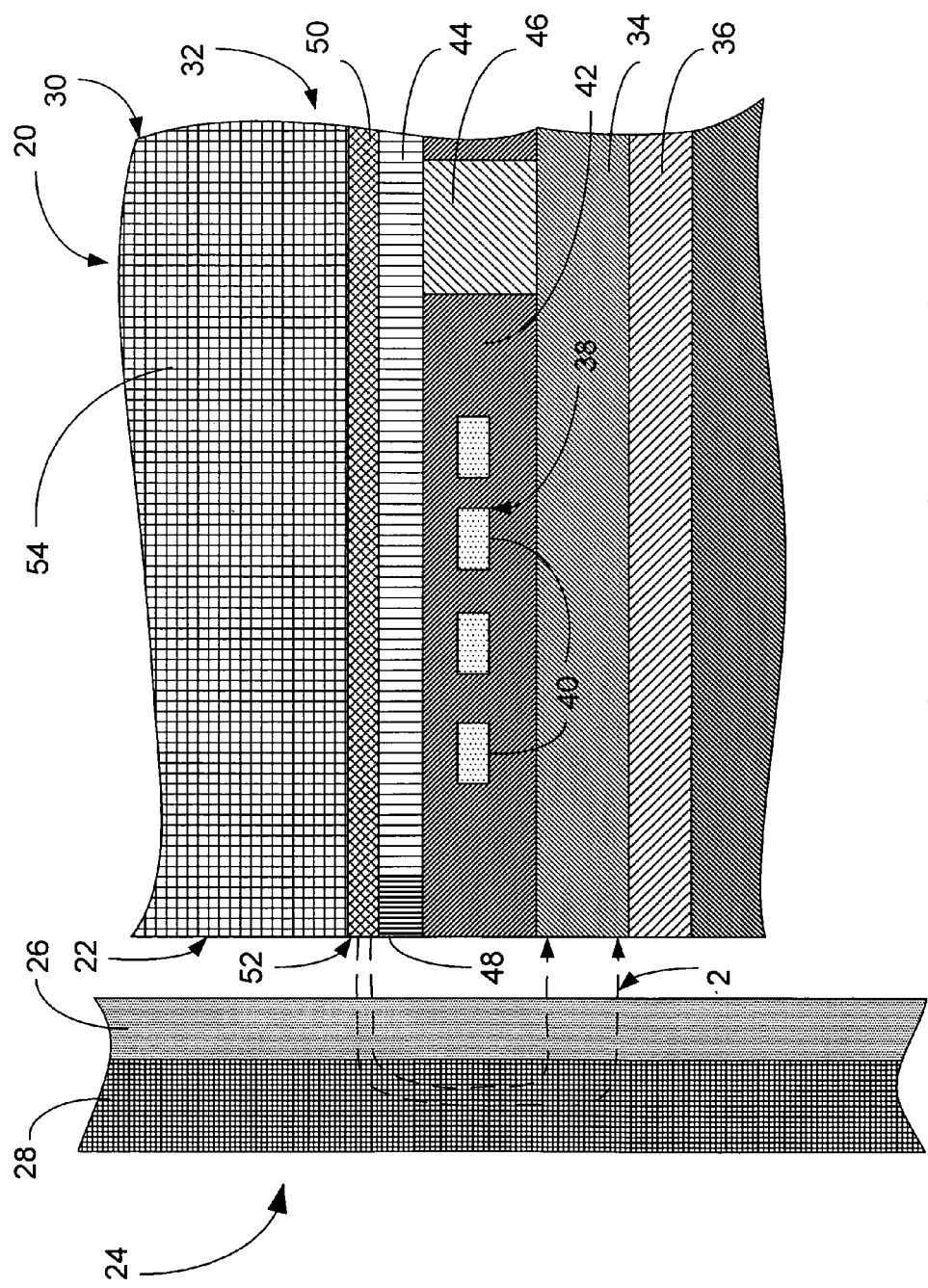
FIG. 1 (prior art) is a side cross-sectional view depicting various components of the write head of a prior art perpendicular head.
Figure 2:
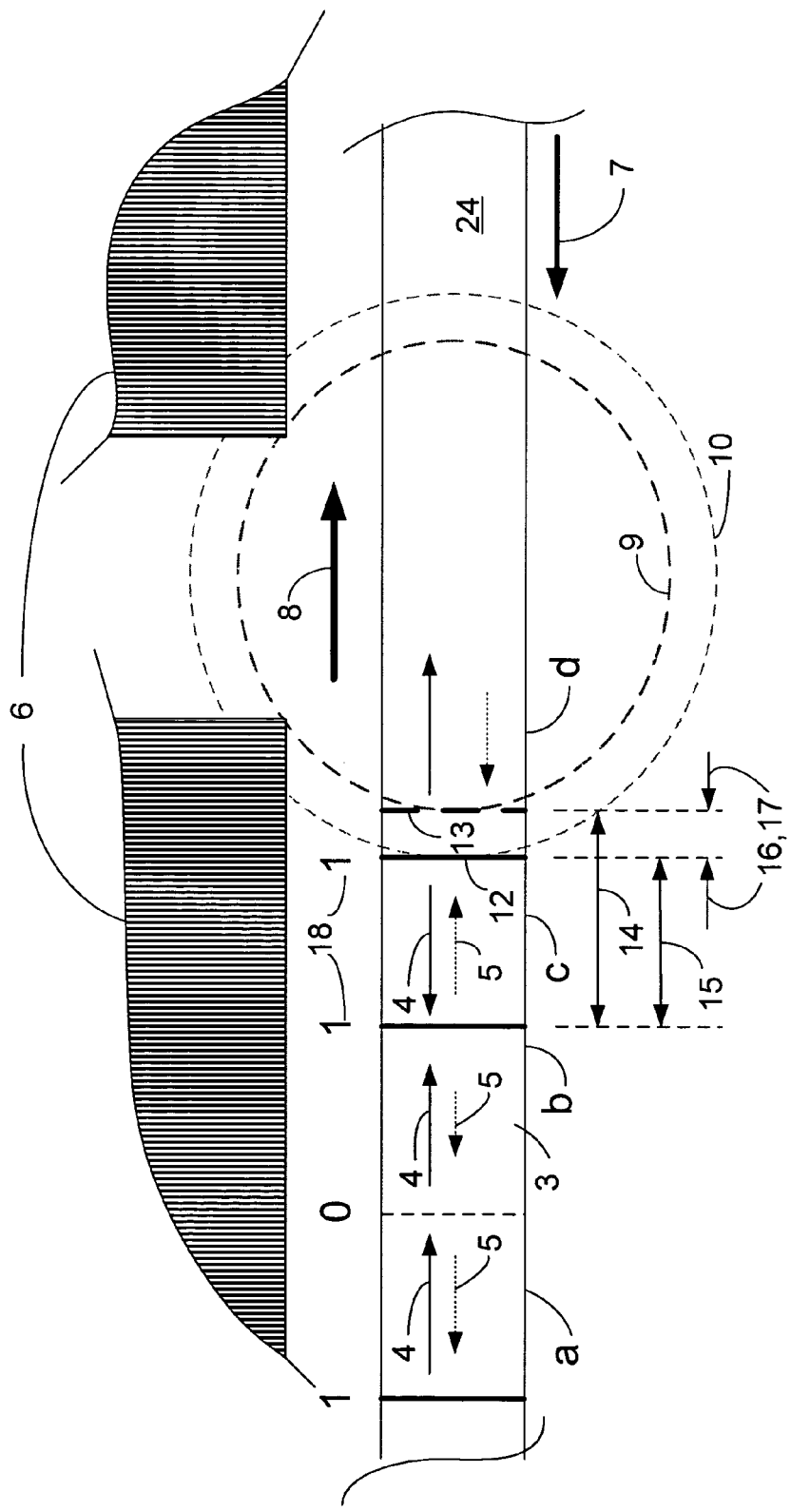
FIG. 2 is a side cross-sectional view of a longitudinal write head and hard disk during write operations showing the magnetic field of normal extent and an expanded magnetic field caused by the addition of a demagnetization field component.
Figure 3:
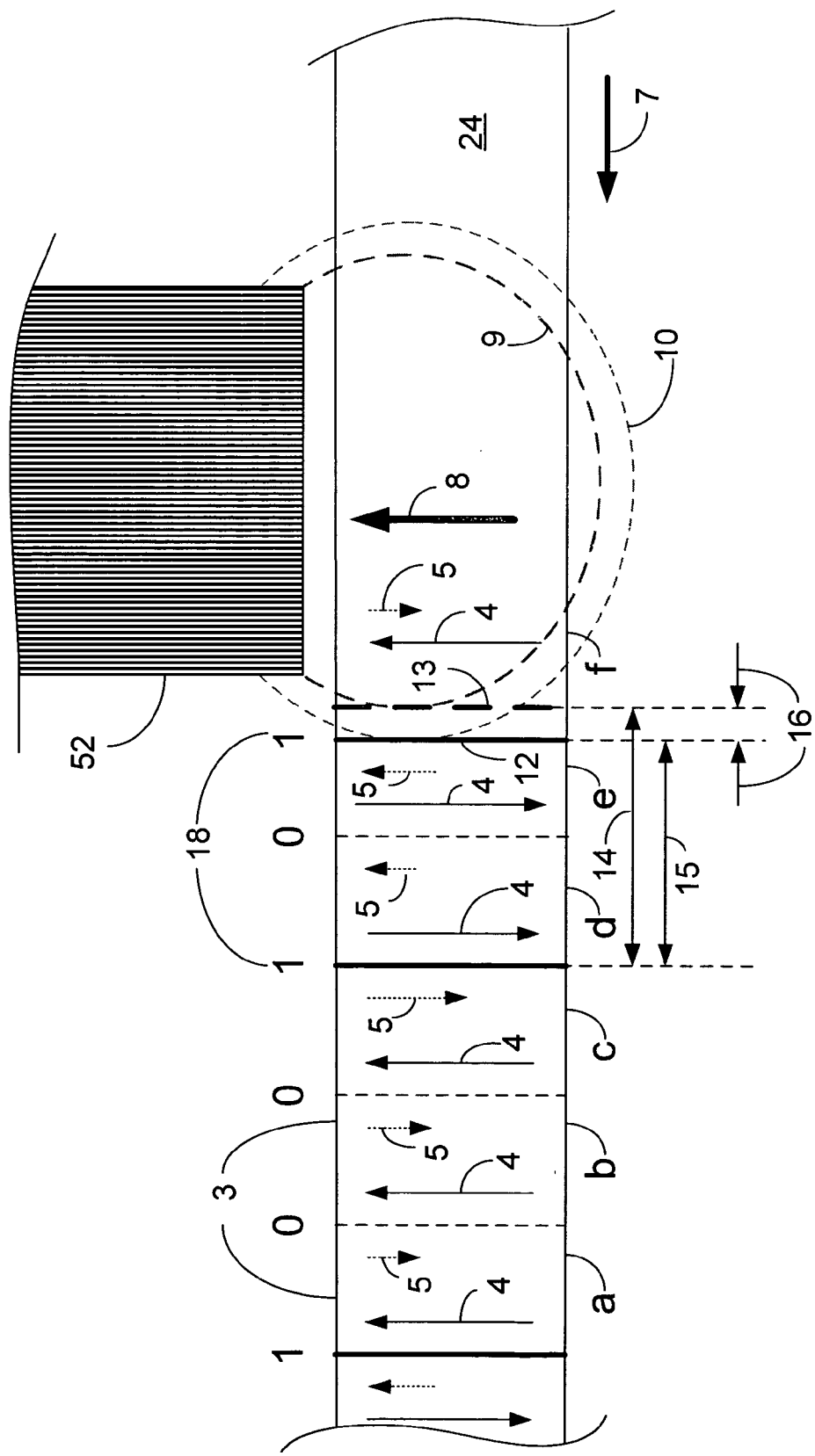
FIGS. 3–6 are side cross-sectional view of a perpendicular write head and hard disk during write operations showing the magnetic field of normal extent and an expanded magnetic field caused by the addition of a demagnetization field component.

FIG. 1 (prior art) is a side cross-sectional diagram of the write head portion of a typical prior art perpendicular magnetic head. A slider 20 has an air bearing surface (ABS) 22 which flies above the surface of a hard disk 24. The disk 24 includes a high coercivity magnetic layer, also referred to as the hard layer 26, that is fabricated on top of a magnetically soft layer 28.

The perpendicular head 30 typically includes a read head, which is not shown here. The write head portion, includes a first magnetic pole P1 34 is fabricated upon an insulation layer 36. An induction coil structure 38, which includes coils 40, is fabricated upon the P1 pole 34. The coil turns 40 are typically formed within electrical insulation layers 42. A second magnetic pole layer, typically termed a P2 shaping layer 44, is fabricated on top of the induction coil structure 38. A magnetic back gap piece 46 joins the back portions of the P1 pole 34 and the P2 shaping layer 44, such that magnetic flux can flow between them. The P2 shaping layer 44 is fabricated so that a gap 48 is left between it and the ABS 22, and an alumina fill is deposited across the surface of the wafer which results in filling the gap 48 in front of the P2 shaping layer 44. A P3 layer 50, also called a probe layer, includes a P3 pole tip 52, and is in magnetic flux communication with the P2 shaping layer 44. The P2 shaping layer channels and directs the magnetic flux into the P3 pole tip 52.

The magnetic head 30 is subsequently encapsulated, such as with the deposition of an alumina layer 54. Thereafter, the wafer is sliced into rows of magnetic heads, and the ABS surface of the heads is carefully polished and lapped and the discrete magnetic heads are formed.

Electrical current flowing through the induction coil structure 38 will cause magnetic flux 2 to flow through the magnetic poles 34, 52 of the head, where the direction of magnetic flux flow depends upon the direction of the electrical current through the induction coil. In one direction, current will cause magnetic flux 2 to flow through the P2 shaping layer 44 through the P3 layer 50 to the narrow pole tip 54 into the hard layer 24 and soft layer 28 of the hard disk 24. This magnetic flux 2 causes magnetized data bits to be recorded in the high coercivity layer hard layer 24 where the magnetic field of the data bits is perpendicular to the surface of the disk 24. The magnetic flux then flows into the magnetically soft underlayer 28 and disperse as they loop back towards the P1 pole 34. The magnetic flux then flows through the back gap piece 46 to the P2 shaping layer 44, thus completing a magnetic flux circuit. In such perpendicular write heads, it is significant that at the ABS 22, the P1 pole 34 is much larger than the P3 pole tip 52 so that the density of the magnetic flux passing out from the high coercivity magnetic hard layer 26 is greatly reduced as it returns to the P1 pole layer 34 and will not magnetically affect, or flip, the magnetic field of data bits on the hard disk, such as bits on data tracks adjacent to the track being written upon.

Figure 4:
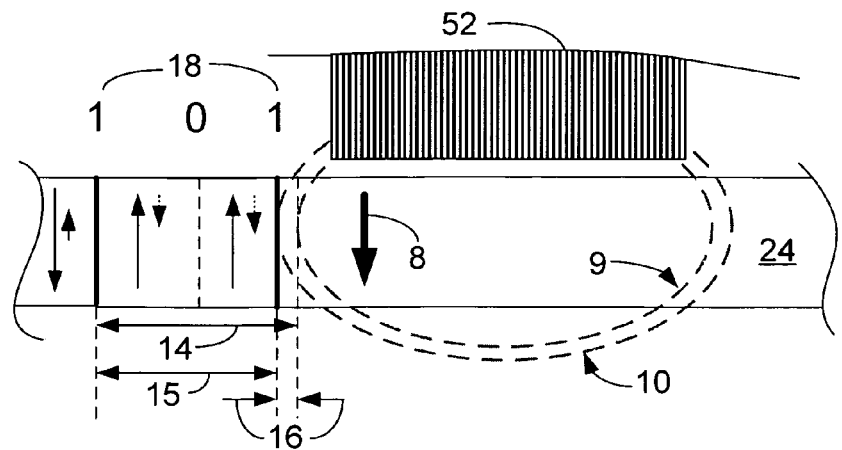
Figure 5:
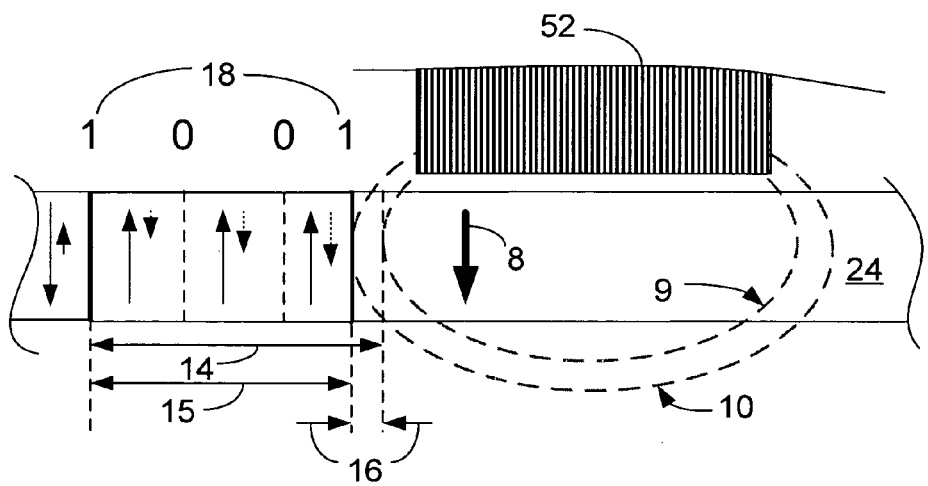
Figure 6:
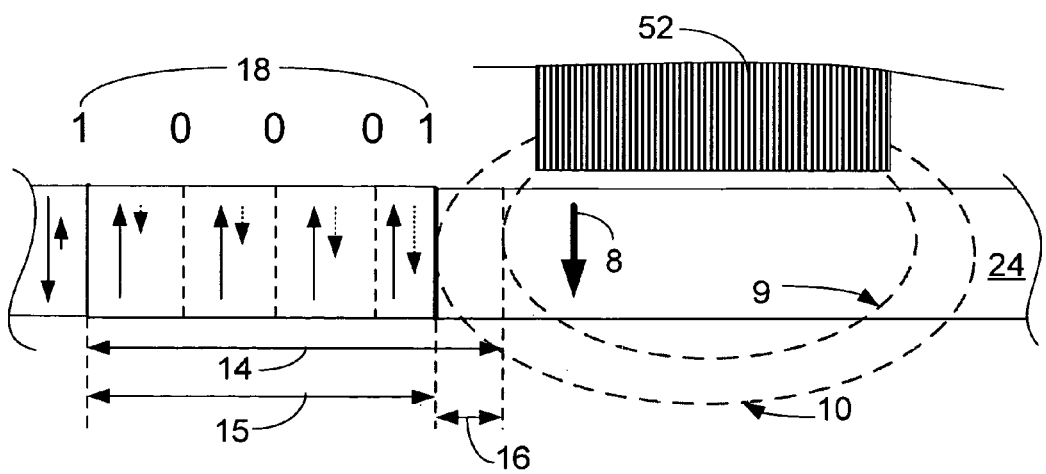

As referred to above, in perpendicular recording, the D field component increases with successive non-transitions, and thus the amount of NLTS is variable, however with the smallest effect being seen in successive transitions, and the effect increasing with each successive non-transition. Thus a pattern reading "1 1" would have almost no NTLS, a pattern reading "1 0 1" would have a small NTLS 16, as shown in FIG. 4, a pattern reading "1 0 0 1" having more NTLS 16, as shown in FIG. 5, and a pattern reading "1 0 0 0 1" having even more NTLS 16, as shown in FIG. 6. As discussed above, a dibit includes a pair of transitions, where a "1" is followed by another "1", with or without intervening zeroes. Put another way, in longitudinal recording, the longer the di-bit, the shorter the NLTS, and in perpendicular recording, the longer the dibit, the longer the NLTS.

Figure 7:
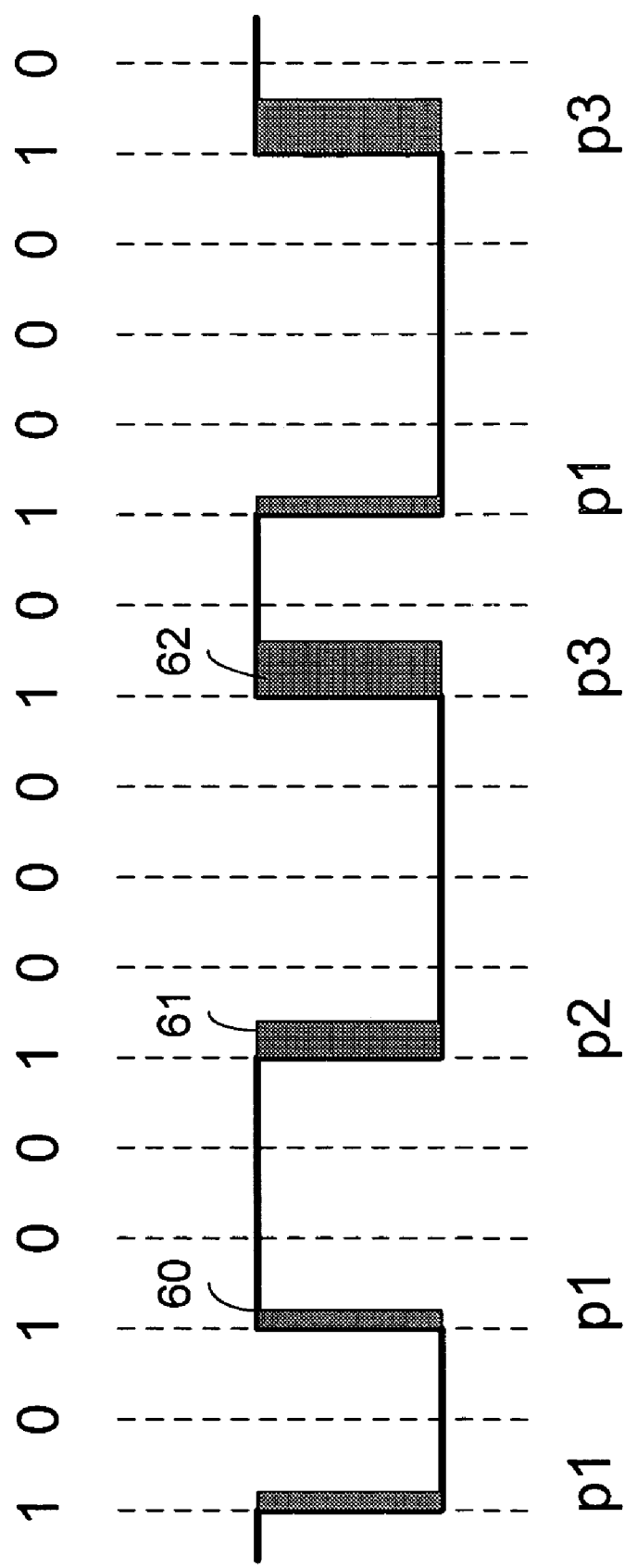
FIG. 7 is a graphical representation of the amount of NTLS experienced when writing different data bit patterns.

Since the NLTS varies in length, any precompensation scheme that intends to correct the NLTS effect should also apply varying amounts of shift to realign the actual transitions with the ideal transitions. Thus, a scheme which applies only one level of precompensation will not be as effective as a scheme which applies varying amounts of precompensation, which is known as "multi-level precompensation". FIG. 7 shows a graphical representation of the varying amount of precompensation necessary for dibits of varying length in a perpendicular write situation. These are designated as p1 60, p2 61 and p3 62 for three levels of increasing precompensation corresponding to bit patterns reading "1 0 1", "1 0 0 1" and "1 0 0 0 1" respectively. These levels are not necessarily linear, and the multi-level precompensation of the present invention is not limited to only three levels.

Figure 8:
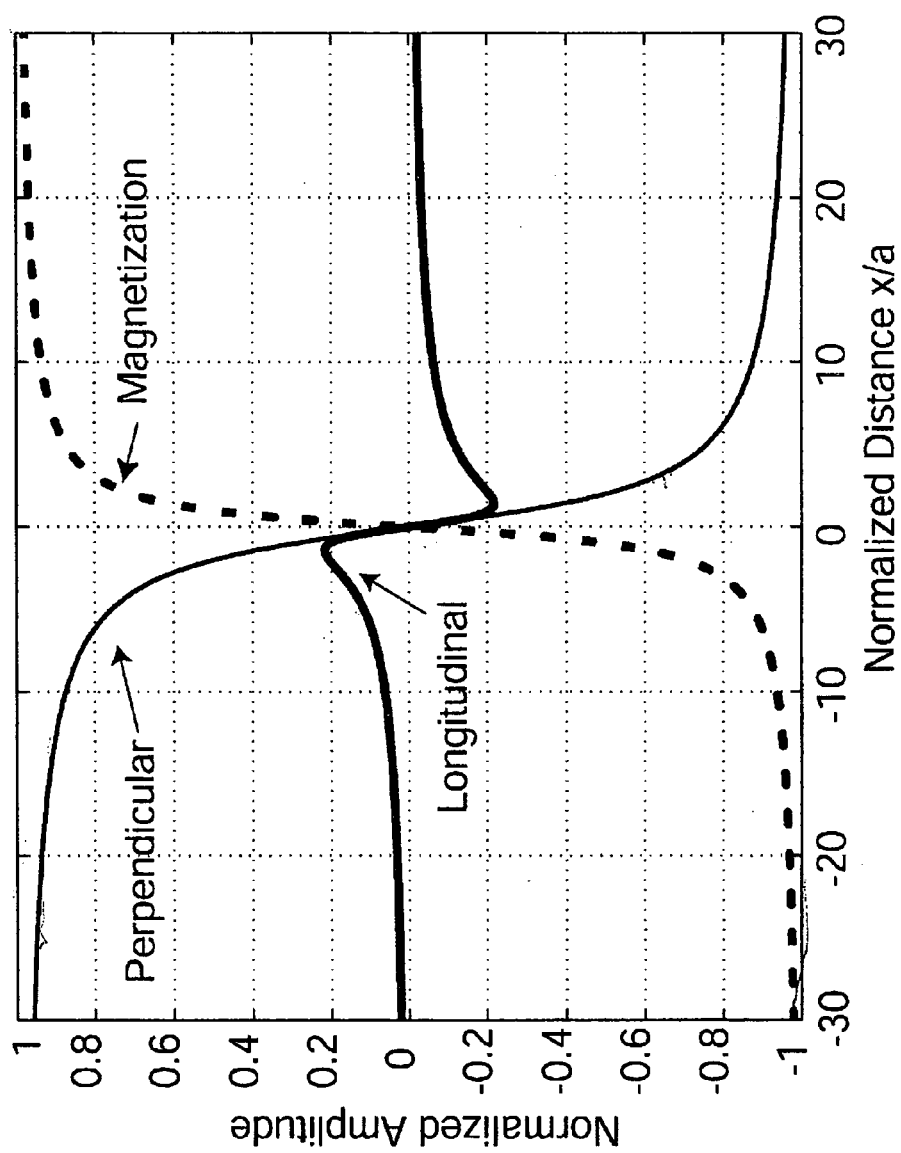
FIG. 8 is a graph showing a comparison of the normalized amplitude vs. distance of demagnetization field for perpendicular and longitudinal recording operations.

FIG. 8 is a graph showing a comparison of the normalized amplitude vs. distance of demagnetization field for perpendicular and longitudinal recording operations. It is noted that the response is fairly linear in the range of −10 to 10, so that the amount of demagnetization, and thus NLTS increases steadily with successive zeroes between transitions but levels off as it increases beyond this range. The chart shows a magnetic transition (dashed line) and demagnetization field amplitudes for longitudinal and perpendicular recording (as marked). As seen, the longitudinal demagnetization field achieves its maximum adjacent to the transition center, while the maximum of perpendicular demagnetization field is achieved when the transition is sufficiently far away. The horizontal axis is normalized to the so-called "transition parameter" (a), which determines the spatial extent of the transition, recorded in the magnetic media. The transition parameter a is determined by the magnetic head and medium combination. The highest achievable recording density (the smallest distance between two consecutive transitions) is typically close to $\pi a$ (also called a percolation limit), therefore transitions can not be recorded at smaller distances.

For comparison, and understanding of precompensation schemes and their differences from the present invention, FIG. 9 (prior art) shows a detail view of the NLTS effect during longitudinal recording, again showing data bits 3 a–d, with actual transition boundaries 12 and ideal transition boundaries 13 for a dibit having only two successive transitions, i.e. "1 1", which will be referred to as a unitary dibit 19. The unitary dibit 19 has a first transition T1 64, and a second transition T2 66. The distance between the actual boundary 12 and the ideal boundary 13 is the NLTS 16, which is a positive NLTS 17. In this case the actual second transition boundary T2 66 is "early", and the prior art precompensation scheme typically acts to delay T2 66, thus making T2 66 "late".

FIG. 10 (prior art) shows a detail view of the NLTS effect during perpendicular recording, again showing data bits 3 a–d. Actual transition boundaries 12 and ideal transition boundaries 13 are shown for a unitary dibit 19 designated data bit d, having first transition T1 64, and a second transition T2 66. In this case, the dibit 19 d is longer than normal, since T1 64 has been advanced due to a large demagnetization component accumulated in the previous bits, but the T2 66 is written in roughly the ideal position 13. This is because in perpendicular recording, the D component grows with successive zeroes but there are none following T1 64 here, so the demagnetization component is negligible when writing T2 66. The distance between the actual boundary 12 and the ideal boundary 13 is again the NLTS 16, which is termed "negative" NLTS 68.

In response to this negative NLTS created during the perpendicular writing process, FIGS. 11 and 12 show, for comparison, the prior art precompensation method in FIG. 11 (prior art) and the improved method of precompensation of the present invention shown in FIG. 12.

FIG. 11 (prior art) shows a detail view of the data bits 3 of a hard disk 24 during perpendicular data writing. Data bits a–e are shown, with a transition occurring between data bits c and d, signifying a "1", and another written between d and e, so d is a unitary dibit 19. The ideal transition boundaries 13, are shown, along with T1 64 and T2 66, the actual transition boundaries 12, written without precompensation. As expected with negative NLTS 68, T1 64 has been written early, so that data bit d has an expanded period Te 70 before precompensation.

The typical prior art method of precompensation 200 for perpendicular precompensation involves writing T2 66 "early" in time, so it is advanced to position shown by T2p 72. By moving the T2p 72 forward, theoretically the same amount as T1 64 has moved forward by the NLTS effect, the overall period after precompensation, Tp 74, will match the normal period T 14, although neither transition boundary T1 64 nor T2p 72 matches the position of the ideal transition boundaries 13. Additionally, data bit c will be reduced, as in effect, the entire data bit d has been moved forward in time by the NLTS amount.

In contrast, FIG. 12 shows the method of the precompensation of the present invention 100. FIG. 12 again shows a detail view of the data bits 3 of a hard disk 24 during perpendicular data writing. Data bits a–e are shown, with a transition occurring between data bits c and d, signifying a "1", and another written between d and e, so d is a unitary dibit 19. The ideal transition boundaries 13, are again shown, along with T1 64 and T2 66, the actual transition boundaries 12 which would be written without precompensation. Data bit d again has a expanded period Te 70 before precompensation.

The method of precompensation 100 of the present invention involves writing T1 64 "late" in time, so it is moved backwards to the position shown by T1p 76. By moving the T1p 76 backwards, theoretically the same amount as T1 64 has moved forward by the NLTS effect, the overall period after precompensation achieved by the present invention Tpp 78, will match the normal period T 14, and both transition boundaries T1p 76 and T2 66 will substantially align with the positions of the ideal transition boundaries 13. Now, data bit c will be restored to its ideal length, as data bit d has also been restored to its ideal length, so that Tpp 78 approximately equals T 14.

The delay in writing the transition boundary can be implemented by many conventional delay circuits which will be known to those skilled in the art. Generally the number of non-transition data bits are counted, and a precompensation value correlating to the non-transition count is applied to delay the writing of the transition by the appropriate amount. As discussed before, the amount of NLTS is variable, and thus the precompensation value is also variable, so that a multilevel precompensation is used. These values may be stored and retrieved from an internal table or register, as will be known in the art and applied through known delay circuitry.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method of precompensation for NLTS (Non-Linear Transition Shift) in magnetic recording medium using a perpendicular recording write head, comprising:
   A) maintaining a count of non-transition data bits preceding a data transition to be written;
   B) assigning a precompensation value which correlates to said count of non-transition data bits preceding said data transition to be written;
   C) applying said assigned precompensation value to delay timing of a write signal sent to said perpendicular recording write head so that the location of the actual written data transition more closely aligns with an ideal location of the data transition to be written.

2. The method of magnetic recording of claim 1, wherein: said delay increases with the increase in count of non-transition data bits.

3. The method of magnetic recording of claim 2, wherein: said delay generally increases with the count of non-transition data bits until a limit is approached.

4. A method of magnetically recording a plurality of data bits on a magnetic recording medium using a perpendicular write head, the method comprising:
   A) creating a magnetic write bubble region having a magnetic polarity, which sets the polarity of magnetic bits in said magnetic recording medium;
   B) reversing the magnetic polarity of said magnetic write bubble region in accordance with values of the data bits being recorded on the magnetic recording medium; and
   C) adjusting timing to delay the reversing of the magnetic polarity of the magnetic write bubble region based on a state of at least one data bit previously recorded on the medium.

5. The method of magnetic recording of claim 4, wherein: C involves keeping a count of non-transition data bits preceding a transition data bit, and making an adjustment to said timing in relation to said count.

6. The method of magnetic recording of claim 5, wherein: said adjustment generally increases with the count of non-transition data bits.

7. The method of magnetic recording of claim 6, wherein: said adjustment generally increases with the count of non-transition data bits until a limit is approached.

8. A method of precompensation for NLTS in magnetic recording medium using a perpendicular recording write head, as measured by a dibit having a first transition boundary followed by a second transition boundary, said dibit following at least one non-transitional data bit, the method comprising:
   A) maintaining a count of non-transition data bits preceding a data transition to be written;
   B) assigning a precompensation value which corresponds to said count of non-transition data bits preceding said data transition to be written; and
   C) delaying writing of said first transition boundary of said dibit according to said assigned precompensation value.

9. The method of precompensation of claim 8, wherein: C includes delaying timing of a write signal sent to said perpendicular recording write head for writing said first transition of said dibit.

10. The method of precompensation of claim 9, wherein: said second transition boundary of said dibit is unchanged in time.

11. The method of magnetic recording of claim 8, wherein:
   B involves keeping a count of non-transition data bits preceding said first transition boundary of said dibit, and making an adjustment to said timing in relation to said count.

12. The method of magnetic recording of claim 11, wherein: said adjustment generally increases with said count of non-transition data bits.

13. The method of magnetic recording of claim 12, wherein: said adjustment generally increases with said count of non-transition data bits until a limit is approached.

* * * * *